Patented Nov. 28, 1950

2,531,407

UNITED STATES PATENT OFFICE 2,531,407

N,N-DIMETHYL ACETAMIDE-CONTAINING COMPOSITIONS

Gaetano F. D'Alelio, Shaker Heights, Ohio, assignor to Industrial Rayon Corporation, Cleveland, Ohio, a corporation of Delaware No Drawing. Application October 25, 1946, Serial No. 705,804

11 Claims. (Cl. 260—32.6)

This invention relates to the preparation of compositions of polymeric materials, and to the production of shaped articles therefrom. More specifically, the invention provides new and useful compositions of acrylonitrile polymers, and shaped articles formed therefrom. Moreover, it provides a method for preparing such shaped articles. The term "polymers" is intended herein to include copolymers.

Very useful polymers have been prepared from acrylonitrile with or without other polymerizable substances, for example, vinyl, vinylidene and other mono-ethylenic compounds, and conjugated diene compounds such as butadiene, etc. in which polymers at least 50% by weight is acrylonitrile. These acrylonitrile polymers possess desirable physical and chemical properties including toughness and solvent resistance to common organic solvents such as methyl or ethyl alcohol, acetone, ethyl ether, ethyl acetate, hydrocarbon solvents, chlorinated hydrocarbons and the like. Because of these properties, it has been considered desirable that these polymeric materials be fashioned into fibers, films, and other shaped articles.

In accordance with the present invention it has been found that new compositions useful for the production of shaped articles such as, for example, filaments, films and the like, may be prepared by treating acrylonitrile polymers with N,N-dimethyl acetamide. In addition the polymerization of the acrylonitrile, either alone or in the presence of other polymerizable materials, may be accomplished in the presence of N,N-dimethyl acetamide. By employing the methods of this invention new fibers, films and the like having particularly desirable properties may be readily produced.

To accomplish these objectives it has been proposed to use concentrated aqueous solutions of inorganic salts such as lithium bromide, zinc chloride, sodium chloride and sodium sulfocyanide (Rein U. S. Patent No. 2,140,921), or molten quaternary ammonium salts such as benzyl pyridimium chloride, (Rein U. S. Patent No. 2,117,210), in the preparation of compositions of acrylonitrile polymers. However, these compositions have been found generally unsatisfactory for use in the formation of yarns and films. The former type of solution, upon extrusion in coagulating baths, gives shaped articles that contain large amounts of the inorganic salts of the proposed solvent. The presence of the foreign materials in the resultant composition produces discontinuities which cause weakness and brittleness in the shaped articles. The compositions containing the quaternary ammonium salts are dark colored, indicating some decomposition or reaction of the polyacrylonitrile in the presence of the molten salt, and the films or filaments obtained from such solutions are generally extremely brittle, highly colored and very weak.

It has also been proposed (Latham U. S. Patent No. 2,404,714) that certain compounds containing the dimethyl carbamyl group may be used as solvents for acrylonitrile polymers containing at least 85% by weight of acrylonitrile only if the carbon content of the compound be within certain limits. These limits are set by the formula

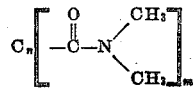

wherein $m$ and $n$ represent integers, $m$ being equal to or greater than 1, and $n$ being of such a value that the ratio $n/m$ is equal to or less than 1.5, except that when $m$ equals 1, $n$ must equal zero. The limitations of this formula indicate clearly that N,N-dimethyl acetamide is not to be considered as a solvent for acrylonitrile polymers and copolymers described in that patent.

It has been found that the new compositions of this invention may be produced by dissolving acrylonitrile polymers, in which 50% or more by weight is acrylonitrile, in N,N-dimethyl acetamide which is substantially free of acetic acid. N,N-dimethyl acetamide is commonly made by the reaction of acetic acid with dimethyl amine and the boiling point of this product is given as 165–175° C. (Mitchell and Reid: J. Am. Chem. Soc. 53, 1879 (1931)). This distilled dimethyl acetamide product contains a considerable amount of unreacted acetic acid in the form of an azeotropic mixture. Even careful distillation may give as high as 21% by weight of acetic acid in the dimethyl acetamide distillate. It has been found that the presence of acetic acid has a pronounced deleterious effect on the solvent power of dimethyl acetamide for acrylonitrile polymers and copolymers.

Acetic acid is generally found in N,N-dimethyl acetamide obtained by the common method of preparation. When N,N-dimethyl acetamide is completely acetic acid-free, its boiling point drops from 165–175° C. (J. Am. Chem. Soc., 53, 1879 (1931)) to 165.8–164.9° C./759 mm. (J. Am. Chem. Soc., 59, 401 (1937)). N,N-dimethyl acetamide may be sufficiently purified for the purpose of this invention by adding an acid binding agent, such as solid caustic, to react with the free acetic acid and subsequently distilling the decanted liquid.

This invention will be more fully described by the following examples although it is understood that the invention is not intended to be limited by these examples. These examples illustrate the use of N,N-dimethyl acetamide in preparing compositions of acrylonitrile polymers. In these examples "parts" of materials is intended to means parts by weight.

*Example I*

A 5% by weight solution of polyacrylonitrile in N,N-dimethyl acetamide is prepared simply by adding 5 parts of the polymer to 95 parts of the acid-free dimethyl acetamide at room temperature and stirring the mixture until solution is completed. More concentrated solutions, for example 20-25%, are readily prepared by heating a mixture of polymer and N,N-dimethyl acetamide at temperatures higher than room temperature, including the boiling temperature of the amide at atmospheric or superatmospheric pressure. These solutions are particularly useful in the preparation of fibers, films, etc.

*Example II*

A copolymer of 80 parts acrylonitrile and 20 parts vinylidene chloride is substantially insoluble in methyl alcohol, ethyl alcohol, acetone, methyl acetate, butyl acetate, benzene, cyclohexane, dioxan, monochlorobenzene, and cyclohexanone. Likewise it is also insoluble in ordinarily effective solvents such as nitromethane and nitroethane. A 10% solution of the same copolymer in N,N-dimethyl acetamide, substantially free of acetic acid, is effected by stirring at room temperature. More concentrated solutions, for example in excess of 10% and up to 20-25% or higher, are prepared by heating the mixtures to temperatures up to and including the boiling point of the dimethyl acetamide. In some cases the solution is advantageously prepared under superatmospheric pressures. Fibers made from these copolymer compositions heat treated under tension for 1 hour at 150° C. and tested in boiling water show a shrinkage of about 3% maximum.

*Example III*

A copolymer of 60 parts of acrylonitrile and 40 parts vinylidene chloride behaves in the same manner as the 80-20 copolymer of Example II with regard to insolubility in the organic solvents and in other highly polar solvents. However, solutions of this copolymer in substantially acetic acid-free N,N-dimethyl acetamide are prepared with no difficulty. Fibers from these compositions when heat treated as in Example II show a maximum shrinkage of 2%. Tenacities of these fibers are in the range of 4-6 gms. per denier and elongations of 12-20%, depending on the methods and conditions of treatment. The wet strengths of these fibers are practically equal to their dry strength.

*Example IV*

A copolymer of 95 parts acrylonitrile and 5 parts acrylic acid shows the same solubility characteristics as indicated for the copolymers of Examples II and III. Compositions satisfactory for the preparation of fibers, films, foils, bristles, etc., are readily prepared in substantially acetic acid-free N,N-dimethyl acetamide.

*Example V*

A copolymer of 80 parts acrylonitrile and 20 parts styrene is insoluble in the solvents named in Example II. However, it is soluble in N,N-dimethyl acetamide substantially free of acetic acid. These compositions may be used in the preparation of formed polymers which may be cold drawn and heat treated in produce molecularly oriented structures.

*Example VI*

A copolymer of 85 parts of acrylonitrile and 15 parts of dimethyl itaconate is insoluble in nitromethane but is soluble in substantially acetic acid-free N,N-dimethyl acetamide. Cold drawn films which were heat treated at 150° C. showed toughness and excellent ductility. They also showed birefringence under crossed Nicol prisms.

*Example VII*

A copolymer of 50 parts acrylonitrile and 50 parts vinylidene chloride is insoluble in the common organic solvents and in nitromethane and only very slightly soluble in certain cyclic ketones. It is very readily soluble, however, in N,N-dimethyl acetamide which is substantially acetic acid-free. Such a composition may be used in the preparation of formed polymers which may be cold drawn and heat treated to produce molecularly oriented structures.

*Example VIII*

Copolymers of 95-90 parts of acrylonitrile and 5-10 parts of vinyl chloride may be dissolved in substantially acetic acid-free N,N-dimethyl acetamide. Fibers from these compositions when heat treated under tension for one hour at 150° C. and when tested in boiling water showed a maximum shrinkage of about 3%. Tenacities of these fibers are in the range of 4-6 gms. per denier and elongations of 12-20%, depending on the methods and conditions of treatment. The wet strengths of these fibers are practically equal to their dry strengths.

*Example IX*

Ten parts N,N-dimethyl acetamide and 90 parts polyacrylonitrile are ball milled for sufficient time to produce a homogeneous mixture.

(a) This composition is moldable per se to produce uniform dense articles by standard molding processes using heat and pressure.

(b) Solutions of acrylonitrile polymers and copolymers are more readily prepared by dispersing such a pre-milled mixture of the polymer and N,N-dimethyl acetamide than with similar polymers not so treated. The use of pre-treated polymers permits the ready dispersion of the polymers in the solvent and shortens the time required for its solution.

The composition described in paragraph (a) Example IX may be molded into cohesive structures, that is, it may be made cohesive under heat, pressure, or heat and pressure.

Solutions of acrylonitrile polymers and copolymers in N,N-dimethyl acetamide are especially advantageous in spinning processes for a number of reasons. The comparatively lower viscosity of the dimethyl acetamide solutions as compared with compositions of similar concentration using certain other solvents permits easier spinning and the use of more concentrated compositions thereby reducing the amount of solvent to be removed and the resultant volume shrinkage. Moreover, the fact that the dimethyl acetamide boils at 165°

C. versus 153° C. for dimethyl formamide permits higher spinning temperatures and lower recovery losses. This higher boiling point also permits higher temperatures to be used without the necessity of superatmospheric pressures, to hasten the dissolving process.

Compositions of N,N-dimethyl acetamide and acrylonitrile polymers and copolymers may tolerate traces of acetic acid but any appreciable amounts cause viscosity and solubility changes which present spinning difficulties. These difficulties include the obvious problems introduced by the precipitation of solid materials in the feed lines, spinnerettes and coagulating baths of spinning equipment. The tolerance for acetic acid depends on a number of factors, for example, (a) The concentration of acrylonitrile polymer or copolymers;
(b) The type of polymer or copolymer;
(c) The intrinsic solubility characteristics of the polymeric material;
(d) The spinning solution temperatures, etc.

In general, however, the concentration of acetic acid should be less than about 1–5%, preferably 1–2% for polyacrylonitrile. The tolerance in the case of acrylonitrile copolymers will vary, depending on the type and amount of co-monomer in the polymer molecule but generally should be below 21% by weight acetic acid.

Fibers having especially advantageous properties, such as high orientation, high tenacity, high elastic recovery and low shrinkage, may be prepared from compositions of this invention by using acrylonitrile copolymers of vinyl and vinylidene chloride. These halides may be described by the formula

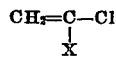

wherein X is hydrogen or chlorine. In these copolymers, as well as the other acrylonitrile copolymers, the acrylonitrile content in the polymer molecule is preferably at least 50 percent, although in some cases copolymers having not less than 80 percent acrylonitrile are particularly advantageous.

For various purposes it may be desirable to chemically and physically modify the polymeric compositions of this invention by the presence of other materials. The N,N-dimethyl acetamide used in this invention is also useful in the preparation of mixtures of acrylonitrile polymers with various modifying agents such as other polymers, for example, polyvinyl chloride and polyvinylidene chloride, partial solvents or non-solvents, or mixtures of these, pigments, dyes, plasticizers, stabilizers, spinning agents, incrustation inhibitors, etc.

In the practice of this invention it is sometimes advantageous to polymerize acrylonitrile, in the presence or absence of other polymerizable monomers, in situ while the mass is dissolved in N,N-dimethyl acetamide. In certain cases, particularly where copolymerization products are desired and especially where the copolymerizing monomers are not water soluble, the mixture may be polymerized with advantage in an emulsion system.

The acrylonitrile polymers and copolymers may be prepared by any suitable polymerization method, such as the ammonium persulfate catalyzed polymerization of monomer or monomers dissolved or emulsified in water. Molecular weights of these polymers and copolymers are preferably within the range of 10,000 to 250,000, or even higher, although polymers having molecular weights between 40,000 and 150,000 may be used with particular advantage. However, polymers of molecular weight less than 10,000 may be used for other purposes, such as impregnants, solvent-resistant coatings, etc. The Staudinger equation permits evaluation of molecular weights by viscosity measurements:

$$\text{Molecular weight} = \frac{N_{sp}}{K_m C}$$

wherein $K = 1.5 \times 10^{-4}$, for many acrylonitrile polymers $$N_{sp} = \frac{\text{viscosity of solution}}{\text{viscosity of solvent}} - 1$$

and $C =$ The concentration of the polymer in solvent expressed in molarity per 1000 ml. of solvent at 20° C The molecular weight of the polymer or copolymer is dependent on the concentration of monomer or monomers, the amount and type of catalyst, temperature of reaction, etc.

As mentioned above, the compositions of this invention are especially useful in the preparation of fibers, filaments, films, etc. either by dry spinning or by wet spinning into coagulating baths of water, glycerine, acetic acid, aqueous salt solutions or other suitable liquids or mixtures of liquids.

In many cases, the formed article may be cold drawn when it is substantially free from dimethyl acetamide. In other cases a plasticizing effect may be obtained when the polymer contains small quantities, that is, 1–10% of dimethyl acetamide. With this acetamide as a plasticizer the formed polymer may be cold drawn at a lower temperature than the corresponding acrylonitrile polymer free of plasticizer. The N,N-dimethyl acetamide plasticized polymers of this invention are particularly adapted to the preparation of molded articles or extruded forms such as rods, tubing, etc. The formed articles of this invention may be cold drawn up to 600–800% or more and thereafter heat treated in the stretched form at temperature of 125–185° C. but preferably at temperatures of 145–155° C.

Fibers obtained in accordance with the invention can be stretched to oriented structures of high tenacity and high elastic recovery. These stretched fibers exhibit characteristic X-ray patterns showing orientation along the fiber axis. Yarns made from these fibers may be used in making stockings and, because of their heat-resistance, may also be fashioned into more general, all-purpose fabrics such as for blouses, suits, skirts, etc.

The compositions of this invention are also suitable for use in the preparation of various other shaped articles and also for use as lacquers or coating compositions. Moreover, products obtained from these compositions are practically free of undesirable salts and especially impervious to moisture and solvents.

I claim:

1. A composition of matter comprising polyacrylonitrile dissolved in N,N-dimethyl acetamide substantially free from acetic acid.

2. A composition of matter comprising N,N-dimethyl acetamide substantially free from acetic acid and a polymer of acrylonitrile containing in the polymer molecule at least 50 percent by weight of acrylonitrile.

3. A composition of matter comprising a polymer of acrylonitrile dissolved in N,N-dimethyl acetamide substantially free from acetic acid, said polymer containing in the polymer molecule at least 50 percent by weight of acrylonitrile.

4. A composition of matter comprising N,N-dimethyl acetamide substantially free from acetic acid and a polymer of acrylonitrile containing in the polymer molecule at least 80 percent by weight of acrylonitrile.

5. A composition of matter comprising a polymer of acrylonitrile dissolved in N,N-dimethyl acetamide substantially free from acetic acid, said polymer containing in the polymer molecule at least 80 percent by weight of acrylonitrile.

6. A composition of matter comprising N,N-dimethyl acetamide substantially free from acetic acid and a copolymer of acrylonitrile and a compound having the formula

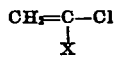

wherein X is a member of the class consisting of hydrogen and chlorine, said copolymer containing in the polymer molecule at least 80 percent by weight of acrylonitrile and said copolymer being dissolved in N,N-dimethyl acetamide.

7. A composition comprising a cohesible mixture of N,N-dimethyl acetamide substantially free from acetic acid and acrylonitrile polymers adapted for the preparation of formed articles.

8. A composition of matter as defined in claim 3 in which the polymer has a molecular weight between 10,000 and 250,000.

9. A composition of matter as defined in claim 5 in which the polymer has a molecular weight between 40,000 and 150,000.

10. The method for preparing polymeric spinning compositions which comprises dissolving a polymer of acrylonitrile in N,N-dimethyl acetamide which is substantially free from acetic acid, said polymer containing in the polymer molecule at least 50% by weight of acrylonitrile.

11. The method for preparing polymeric spinning solutions which comprises admixing a polymer of acrylonitrile and N,N-dimethyl acetamide which is substantially free from acetic acid, and dissolving said polymer in said N,N-dimethyl acetamide, said polymer containing in the polymer molecule at least 80% by weight of acrylonitrile.

GAETANO F. D'ALELIO.

REFERENCES CITED

The following references are of record in the file of this patent:

UNITED STATES PATENTS

| Number | Name | Date |
|---|---|---|
| 2,325,060 | Ingersoll | July 27, 1943 |
| 2,346,208 | Conaway | Apr. 11, 1944 |
| 2,404,713 | Houtz | July 23, 1946 |
| 2,404,714 | Latham | July 23, 1946 |
| 2,404,717 | Houtz | July 23, 1946 |
| 2,404,724 | Houtz | July 23, 1946 |
| 2,405,008 | Berry et al. | July 30, 1946 |
| 2,420,565 | Rugeley et al. | May 13, 1947 |